United States Patent
Vichniakov

(10) Patent No.: US 7,850,118 B2
(45) Date of Patent: Dec. 14, 2010

(54) STRUCTURAL ELEMENT, METHOD FOR MANUFACTURING A STRUCTURAL ELEMENT AND USE OF A STRUCTURAL ELEMENT FOR AN AIRCRAFT HULL

(75) Inventor: Alexei Vichniakov, Suelzetal (DE)

(73) Assignee: Airbus Deutschland GmbH, Hamburg (DE)

( * ) Notice: Subject to any disclaimer, the term of this patent is extended or adjusted under 35 U.S.C. 154(b) by 881 days.

(21) Appl. No.: 11/290,042

(22) Filed: Nov. 29, 2005

(65) Prior Publication Data

US 2006/0156662 A1  Jul. 20, 2006

Related U.S. Application Data

(60) Provisional application No. 60/632,091, filed on Dec. 1, 2004.

(30) Foreign Application Priority Data

Dec. 1, 2004  (DE)  ........................ 10 2004 058 014

(51) Int. Cl.
*B64C 1/00*  (2006.01)
(52) U.S. Cl. .................. 244/123.3; 244/123.5; 244/119; 52/514; 428/119
(58) Field of Classification Search ............. 244/117 R, 244/119, 123.1, 132, 123.3, 123.5; 428/119, 428/120, 137, 156, 61; 52/514
See application file for complete search history.

(56) References Cited

U.S. PATENT DOCUMENTS

| | | | |
|---|---|---|---|
| 3,487,518 A * | 1/1970 | Hopfeld | ................... 29/897.35 |
| 3,567,407 A | 3/1971 | Yoblin | |
| 3,616,113 A * | 10/1971 | Sawyer | ....................... 220/683 |
| 3,622,283 A | 11/1971 | Sara | |
| 3,950,115 A | 4/1976 | Euler | |
| 4,113,910 A | 9/1978 | Loyd | |
| 4,177,306 A * | 12/1979 | Schulz et al. | ............... 428/107 |
| 4,256,790 A * | 3/1981 | Lackman et al. | .............. 428/73 |
| 4,331,495 A * | 5/1982 | Lackman et al. | .............. 156/93 |
| 4,331,723 A | 5/1982 | Hamm | |
| 4,966,802 A | 10/1990 | Hertzberg | |
| 5,242,523 A * | 9/1993 | Willden et al. | .............. 156/285 |

(Continued)

FOREIGN PATENT DOCUMENTS

DE  196 39 667 C1  3/1998

(Continued)

OTHER PUBLICATIONS

Definition of the term "skin" from www.dictionary.com.*

(Continued)

*Primary Examiner*—Benjamin P Lee
(74) *Attorney, Agent, or Firm*—Christopher Paradies; Fowler White Boggs P.A.

(57) ABSTRACT

A structural element includes the following elements: a carrier element, a reinforcing element, and a sheathing element. At least a portion of the reinforcing element is enveloped by the sheathing element and the reinforcing element is embedded in the carrier element. Materials of the elements are selected to inhibit crack initiation or propagation in the elements and/or from one element to another. An intermediate layer of a different material may be added between elements to further inhibit crack initiation and propagation and to inhibit corrosion, such as galvanic corrosion.

20 Claims, 3 Drawing Sheets

U.S. PATENT DOCUMENTS

| | | | | |
|---|---|---|---|---|
| 5,308,675 | A * | 5/1994 | Crane et al. | 428/120 |
| 5,325,647 | A * | 7/1994 | Forry et al. | 52/309.15 |
| 5,476,704 | A * | 12/1995 | Kohler | 428/119 |
| 5,735,486 | A | 4/1998 | Piening et al. | |
| 5,841,098 | A | 11/1998 | Gedrat et al. | |
| 5,842,317 | A | 12/1998 | Pettit | |
| 6,332,301 | B1 * | 12/2001 | Goldzak | 52/838 |
| 6,364,250 | B1 | 4/2002 | Brinck et al. | |
| 6,478,922 | B1 * | 11/2002 | Rosevear et al. | 156/297 |
| 6,520,706 | B1 * | 2/2003 | McKague et al. | 403/265 |
| 6,543,721 | B2 | 4/2003 | Palm | |
| 6,595,467 | B2 | 7/2003 | Schmidt | |
| 6,712,315 | B2 * | 3/2004 | Schmidt et al. | 244/117 R |
| 6,719,870 | B2 * | 4/2004 | Ludin et al. | 156/293 |
| 6,749,155 | B2 * | 6/2004 | Bergmann | 244/133 |
| 7,198,691 | B2 * | 4/2007 | Ludin et al. | 156/293 |
| 7,205,066 | B1 * | 4/2007 | Hammi et al. | 429/119 |
| 7,213,379 | B2 * | 5/2007 | Carlson et al. | 52/837 |
| 7,238,409 | B1 * | 7/2007 | Peterson et al. | 428/156 |
| 7,380,753 | B2 * | 6/2008 | Kairouz | 244/123.1 |
| 2003/0168555 | A1 * | 9/2003 | Livi et al. | 244/132 |
| 2004/0079838 | A1 * | 4/2004 | Simpson et al. | 244/123 |
| 2004/0195452 | A1 * | 10/2004 | Brofeldt | 244/119 |
| 2004/0265536 | A1 * | 12/2004 | Sana et al. | 428/119 |
| 2005/0112394 | A1 * | 5/2005 | Pham et al. | 428/544 |
| 2006/0208135 | A1 * | 9/2006 | Liguore et al. | 244/117 R |
| 2006/0249626 | A1 * | 11/2006 | Simpson et al. | 244/123.1 |
| 2008/0023582 | A1 * | 1/2008 | Payen | 244/17.11 |

FOREIGN PATENT DOCUMENTS

| | | |
|---|---|---|
| DE | 198 44 035 C1 | 11/1999 |
| DE | 199 24 909 | 6/2000 |
| DE | 100 31 510 A1 | 1/2002 |
| DE | 101 63 848 | 7/2003 |
| DE | 10301445 A1 | 8/2004 |
| FR | 992 762 A | 10/1951 |
| FR | 2 440 831 | 6/1980 |
| WO | WO 88/02671 | 4/1988 |
| WO | 02/066235 A1 | 8/2002 |

OTHER PUBLICATIONS

European Office Action dated Jun. 5, 2008 for European Application No. 05 025 886.2, 4 pages.

* cited by examiner

STRUCTURAL ELEMENT, METHOD FOR MANUFACTURING A STRUCTURAL ELEMENT AND USE OF A STRUCTURAL ELEMENT FOR AN AIRCRAFT HULL

RELATED APPLICATIONS

This application claims the benefit of the filing date of U.S. Provisional Patent Application No. 60/632,091 filed Dec. 1, 2004, and of German Patent Application No. 10 2004 058 014.6 filed Dec. 1, 2004, the disclosures of which are hereby incorporated herein by reference.

FIELD OF ONE EMBODIMENT OF THE INVENTION

The field relates to a structural element, a method for manufacturing a structural element and use of a structural element for an aircraft hull.

TECHNOLOGICAL BACKGROUND

Light structural elements of the kind also used in particular in the aerospace industry often consist of an outer skin reinforced on the inside by a two-dimensional bracing. For example, an aircraft fuselage with an outer skin reinforced by stringers and frames is assembled in this way. Special emphasis is placed on reducing the weight during the design of such light structural elements, however the light structural elements shall satisfy varying strength, fatigue and damage tolerance requirements depending on the respective application. In particular in aircraft construction, there are specific criteria relative to the damage tolerance characteristics of the light structural elements used in this area. At the same time, requirements for a light and cost-effective structural design must be taken into account.

Various requirements relating to different strength, fatigue and damage shall be satisfied during the design of light structural elements as a function of a special application. In particular in aircraft construction, particular emphases is placed on the damage tolerance of light structural elements, since this is important for the safety of passenger transport.

Aircraft fuselages are usually made out of interconnected skin panels which have reinforcing elements. Various known methods join individual skin panels, as well as for joining panels with reinforcing elements. Riveting, bonding and welding procedures are used for joining individual skin panels, as well as for joining skin panels with reinforcing elements.

Advantages offered by welding procedures over bonding have to do with the process automatability, higher quality and reproducibility of individual bonds. Structural elements welded in aircraft construction are resistant to corrosion and easy to repair. They have very good static properties, and allow for a reduction in weight. In addition, the structures fabricated through welding are mostly comparatively cost-effective to manufacture.

DE 196 39 667 and DE 198 44 035 disclose a structural element with a welded skin stringer design. Large-sized skin panels are used to weld on profiles (stringers and frames) via laser welding.

Such structural elements, which may be used in an aircraft, must also satisfy requirements placed on a requisite damage tolerance. In particular in the area of bonds between the skin and reinforcing profiles, integral structures (welded or milled) are highly sensitive. Given a cracking of the skin field, the crack usually propagates under the reinforcing profile without damaging the same, in the case of riveted or adhesively bonded reinforcing profiles.

Given an integral design (such as a welded or milled brace), there is a danger that the crack will also propagate in the reinforcing element. This effect reduces the life of the reinforcing elements, and diminishes the damage tolerant properties of integral structures. Damage tolerance may be increased by raising the skin thickness, using additional local reinforcing means, or by adjusting the skin thickness to load requirements. However, these measures increase the weight, and are cost-intensive.

DE 199 24 909 discloses a thickening in the foot area of the brace in an integral structural element for crack delay or deflection. However, since the thickening is integral, i.e., the brace and thickening are designed as a combined component, there is also the danger of continuous cracking over the entire area of the brace.

Another method for improving damage tolerance involves using additional reinforcements inside the reinforcing profiles (see DE 101 63 848) or on the bracing profiles (see DE 100 31 510) to avoid crack propagation (as in FIG. 1). Given crack propagation in the bracing element, the delay in crack advancement is minimal owing to a quick initiation of the crack inside the reinforcing element. In addition, materials with better mechanical properties are used for the reinforcing elements. On the other hand, these materials have a lower resistance to crack propagation. As a result, the reinforcing elements have a short lifespan after crack initiation.

A structural element 100 for an aircraft described in the prior reference is depicted with reference to FIG. 1.

The structural element 100 comprises a skin panel 101 and stringer element 102 (as the reinforcing element), which are integrally joined, i.e., consist of a single material. To improve the damage tolerance of the structural element 100, a space that incorporates a reinforcing element 103 is provided in the stringer 102. The object of the reinforcing element 103 is to prevent the crack from propagating once a crack has arisen.

However, rapid crack initiation 104 may take place given crack propagation 105 in the structural element 100, despite the provision of a reinforcing element 103. The rapid crack initiation 104 results in a break in the reinforcing element 103. As a result, the crack delay effect of the reinforcing element 103 is minimal.

SUMMARY OF THE INVENTION

A structural element operably inhibits crack propagation when used in a structure. According to one embodiment, a structural element comprises a carrier element, a reinforcing element and a sheathing element. In one example, a portion of the reinforcing element is enveloped by the sheathing element, and embedded in the carrier element.

A method for manufacturing a structural element is provided, wherein the method involves enveloping a portion of the reinforcing element with a sheathing element, and embedding it in a carrier element.

For example, a structural element with the features described above is used for an aircraft hull. In one embodiment, a portion of a reinforcing element may be enveloped with a sheathing element, such as a structural element for an aircraft skin, and may very efficiently inhibit the propagation of a crack that may arise under a strong mechanical load or a given material fatigue. In other words, the damage tolerance of a structural element may be increased by implementing an additional intermediate layer/intermediate structure or a sheathing structure between the carrier element (e.g., a reinforcing element or a surface structure) on the one hand and a reinforcing element (used to reinforce the carrier element) on the other. As a result, a structural element with improved damage tolerance properties is provided. One embodiment of the invention may be used to improve the damage tolerance of welded fuselage shells of an aircraft. Therefore, in one embodiment, a structural element with one or more reinforcing profiles, especially for use in aircraft construction, is provided and may have an improved damage tolerance.

In addition to reinforcing elements (e.g., cylindrical or spherical) which are arranged inside a structural element, which may exert a delaying effect on crack advancement, an intermediate layer (e.g., elastic or soft) made out of another material may additionally be provided between a reinforcing element and a carrier structure to be reinforced. The intermediate layer may also prevent or at least delay crack initiation in the reinforcing element.

The sheathing element or the intermediate layer may prevent direct contact between the carrier (e.g., a brace) and the reinforcing element. By providing an intermediate sheathing element, direct contact between the reinforcing element and brace may be avoided and may improve the corrosion resistance of the structural element. The intermediate layer may be formed by a material that differs from those used in the bracing elements and reinforcing elements and (as the matrix) may have lower strength values than materials from which the carrier element and reinforcing element are formed.

The intermediate layer may contain fibers, such as organic fibers, mineral fibers (e.g., basalt), fiberglass, etc. The intermediate layer may also contain woven materials. These fibers may be provided in a unidirectional (preferably in the longitudinal direction of the bracing element) and/or in a braided form. The intermediate layer may minimize and/or prevent crack initiation in the reinforcing element, and thereby improve characteristics relating to damage tolerance for the entire structural element.

A series of materials may be suitable as the matrix material for the intermediate layer. A combination of epoxy resin and fiberglass may be preferred. However, other resin systems and soft metal alloys may also be used. The reinforcing element with the additional intermediate layer or buffer layer may be used in a stringer or a frame, for example, in a bracing element, or in the skin panel of an aircraft, and thereby may significantly improve the damage tolerance characteristics. An advantage of one embodiment of the invention may be that improved damage tolerance characteristics may be achieved for the integral structures of an aircraft fuselage or wing. Such a high damage tolerance may be of great importance for welded aircraft hulls. Testing shows that crack initiation in the reinforcing element may be efficiently inhibited given crack propagation in the reinforced area. This may reliably prevent a rapid failure of the reinforcing element. An additional (e.g., fiber-reinforced) layer between the individual components of the structural element may locally limit crack propagation in the individual components of the structural element. As a consequence, the part separated by the additional layer may remain intact, and crack growth may be slowed. A similar effect may also used and observed in the reinforcement of stringers and frames.

Welded hull segments may be used in the lower areas of an aircraft fuselage, for example. Increasing the damage tolerance characteristics ("two-bay crack" criterion and residual strength) may enable the use of one embodiment of the invention as a lateral hull or upper hull of an aircraft fuselage as well. One embodiment of the invention may be used in a particularly advantageous manner in welded hull elements (e.g., a skin element to which stringer elements have been welded). In addition, the static characteristics of welded hulls may often be better than those of riveted or adhesively bonded hulls. The manufacturing costs for welded hulls may be distinctly lower than for adhesively bonded or riveted hulls. As a result, expanding the sphere of application for welded hulls according to one embodiment of the invention may significantly reduce manufacturing costs while simultaneously satisfying all other requirements for aircraft construction, such as safety requirements.

In one embodiment of the invention, an aircraft may be provided with a metal structural element consisting of or comprising at least one skin panel and one or more bracing profiles secured to the skin panel. Individual components of the structural element may accommodate reinforcements. At least one intermediate layer may be made out of another material or another material combination than the skin panel, bracing profile and reinforcing element. This material may be arranged between the reinforcing elements and components of the structural element, preventing or reducing direct contact between the reinforcing elements and components of the structural element.

Embodiments of the structural element according to one embodiment of the invention are described below. These embodiments also apply to the method according to one embodiment of the invention and utilization according to one embodiment of the invention.

According to another embodiment, the carrier element of the structural element is a skin panel for an aircraft. In this embodiment, a portion of a reinforcing element enveloped by a sheathing element may be introduced into a skin panel and thus may significantly improve the mechanical stability of the structural element, and may reduce susceptibility to crack propagation. According to still another embodiment, the carrier element is a stringer element or frame element for an aircraft, i.e. a bracing structure that is secured to the carrier element and exhibits increased mechanical strength and reduced crack susceptibility. According to yet another embodiment, the carrier element is a skin panel with stringer element, a stringer element and a frame element, or a frame element secured thereto. A respective portion of the reinforcing element with a sheathing element enveloping the latter may be provided at one or more locations on such a structural element, e.g., in a skin panel on the one hand, and in a stringer element or frame element on the other. This may allow for improved mechanical stability at various locations of such a structural element, and may effectively inhibit crack propagation.

According to yet still another embodiment, the skin panel is integral to the stringer element, a stringer element and a frame element, or a frame element secured thereto. In such an integral design, the crack susceptibility may be greatly diminished by incorporating a reinforcing element with enveloping sheath. According to a further embodiment, the carrier element is a skin panel that accommodates a stringer element, a stringer element and a frame element, or a frame element screwed, riveted, adhesively bonded or attached thereto in whatever way desired. As an alternative to the integral solution, the stringer element and/or the frame element may hence be reversibly or irreversibly attached to the carrier element. In this case as well, a reinforcing element enveloped by a sheathing element may be provided to distinctly improve mechanical stability. According to still a further embodiment, the sheathing element preferably has a thickness of at least 0.05 mm. This may be a minimum value necessary for stopping crack initiation in a particularly effective manner, and thereby significantly reduce crack growth. According to yet a further embodiment, the carrier element and/or the reinforcing element includes a metal material. As a result, the structural element may be used as a metal structural element, for example for the skin of an aircraft.

According to yet still a further embodiment, the reinforcing element and the sheathing element are made out of different materials. This may enable a mutually independent optimization of the respective partial tasks of the reinforcing element and sheathing element, since the different materials may be selectively chosen to reflect the corresponding tasks. According to another embodiment, the sheathing element includes a polymeric material such as plastic, for example. The sheathing element may include an organic material. As an alternative, the sheathing element may comprise or consist of a metal alloy. According to still another embodiment, the sheathing element comprises completely or partially, fibers. Such fibers may be especially advantageous for suppressing crack growth. In one example, the fibers may have a length of at least 20 mm. According to yet another embodiment, the fibers provided run unidirectionally, e.g., in the direction of the reinforcing element, and/or be aligned in the direction of a bracing element. Such an orientation may allow the surrounding element to satisfy its tasks in a particularly effective manner, such as with respect to crack propagation buffering.

According to yet still another embodiment, the fibers are braided. A portion of reinforcing element that is enveloped by the sheathing element may be secured to the carrier elements by welding, riveting or adhesive bonding. This may enable a particularly reliable and secure attachment of the varying components making up the structural element, which as a result, may have good mechanical properties. According to a further embodiment, the structural element is designed as an extruded profile, and may enable a reduction in weight and a low price. According to yet a further embodiment, the structural element is made out of a solid body via milling. According to yet still a further embodiment, the reinforcing elements consist of materials or material composites that differ from other components of the structural element.

BRIEF DESCRIPTION OF THE DRAWINGS

Examples of the present invention are illustrated in the drawings and are described in greater detail in the detailed description. Identical or similar components in the drawings are marked with the same reference signs.

DETAILED DESCRIPTION OF PREFERRED EMBODIMENTS

The depictions in the figures are diagrammatic, and not to scale.

Figure 1:
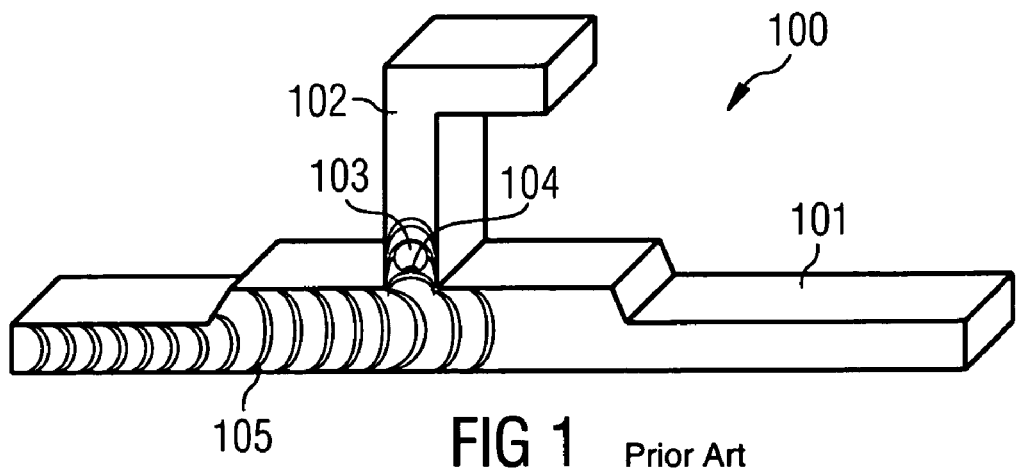
FIG. 1 is a structural element according to the prior art.
Figure 2:
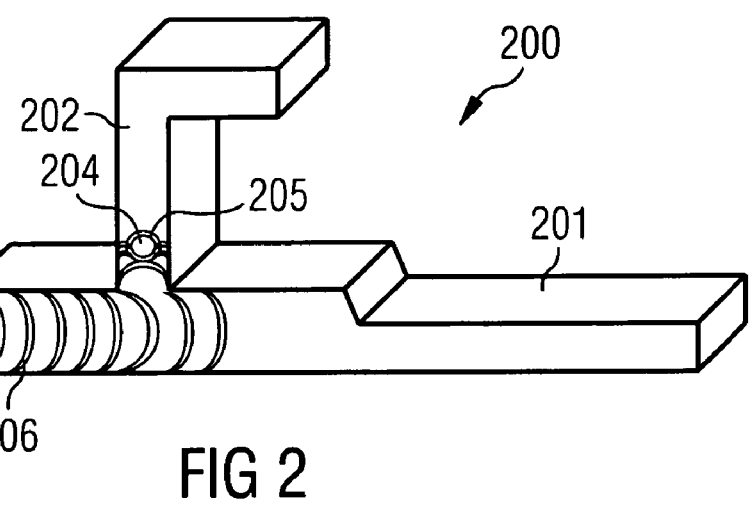
FIG. 2 is a structural element according to a first embodiment.

Now, referring to the embodiment illustrated in FIG. 2, a structural element 200 contains a skin panel 201, a stringer element 202 integrally provided with the skin panel 201 (as a bracing element for bracing the skin panel 201), and a reinforcing element 204 enveloped by a sheathing element 205. The reinforcing element 204 is enveloped by the sheathing element 205, and embedded in the stringer element 202. In one example, the skin panel 201 is integrally provided with the stringer 202 secured thereto. In one example, the skin panel 201 and the stringer element 202 are each made out of an aluminium material. In one example, the reinforcing element 204 is also made out of a metal material. In one example, the sheathing element 205 is fabricated from a mixture of epoxy resin and fiberglass.

If a crack arises in the structural element 200, this crack may only propagate in a part of the skin panel 201, wherein the reinforcing element 204 enveloped by the intermediate layer 205 may inhibit a further propagation of the crack, and thereby protect the bracing element 202 against cracking (see FIG. 2). In one example, the crack propagation 206 is limited as depicted.

Figure 3:
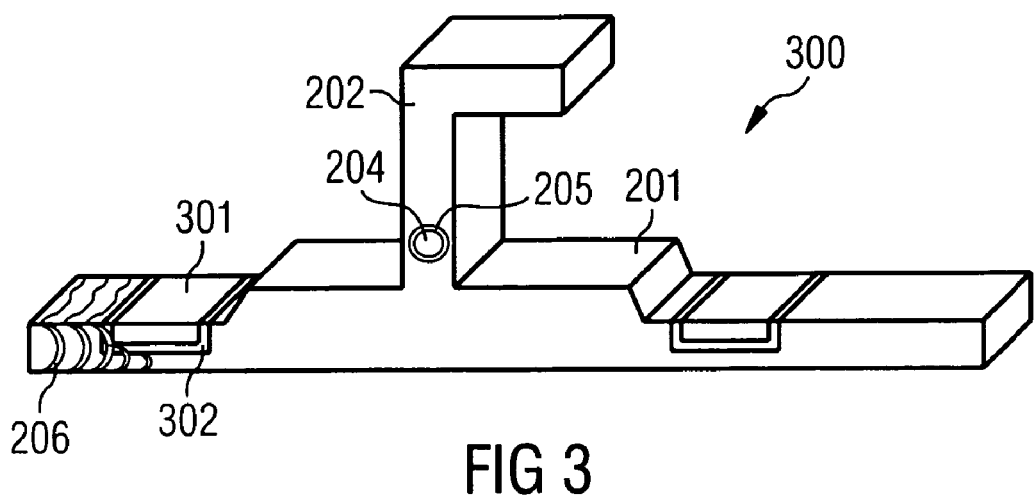
FIG. 3 is a structural element according to another embodiment.

Now, reference will be made to FIG. 3 in describing a structural element 300 according to a second embodiment of one embodiment of the invention. In addition to providing the reinforcing element 204 enveloped by the sheathing element 205 in the stringer element 202, the structural element 300 integrates an additional reinforcing element 301 in the skin panel 201. The additional reinforcing element 301 is enveloped by an additional sheathing element 302, wherein the reinforcing element 301 may be similarly designed as the reinforcing element 304 in terms of material, and the sheathing element 302 may be made out of the same material as the sheathing element 205. Providing the reinforcing element 301 enveloped by the sheathing element 302 in the skin panel 201 as well may allow for further avoidance of crack propagation 206 even more efficiently, and thereby additionally increase the damage tolerance of the structural element 300.

Figure 4:
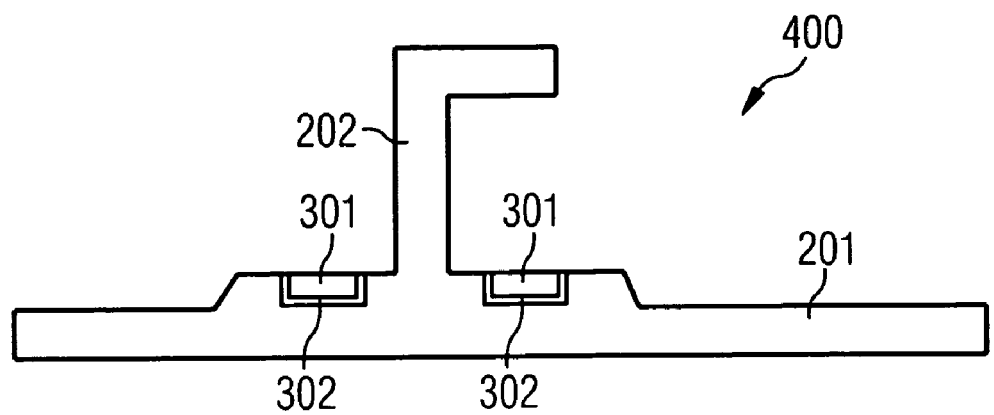
FIG. 4 is a structural element according to another embodiment.

In FIG. 4, a structural element 400 according to a third embodiment of the invention is similar to the structural element 300, but contains no reinforcing element 204 enveloped by a sheathing element 205 in the stringer element 202.

Figure 5:
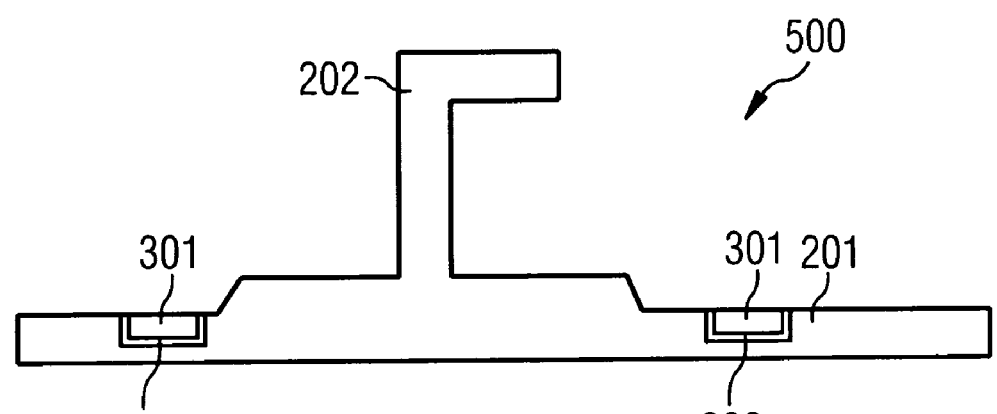
FIG. 5 is a structural element according to another embodiment.

In FIG. 5, a structural element 500 according to a fourth embodiment of the invention, is similar to the structural element 400, but the reinforcing elements 301 are enveloped by a sheathing element 302 are shifted laterally more to the outside.

Figure 6:
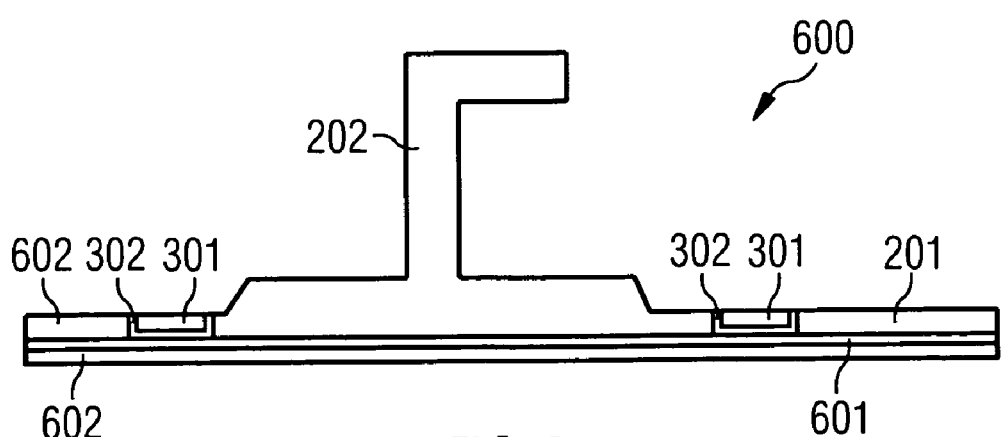
FIG. 6 is a structural element according to another embodiment.

In FIG. 6, a structural element 600 according to a fifth embodiment of the invention is similar to the structural element 500, but, in one example, has an adhesive layer 601 which is embedded between two metal laminates 602 to form the skin panel 201.

FIG. 4 to 6 show embodiments in which reinforcing elements enveloped by a sheathing element are integrated into the skin field. By contrast, FIG. 7 to 9 show embodiments in which reinforcing elements enveloped by a sheathing element are integrated into a bracing.

Figure 7:
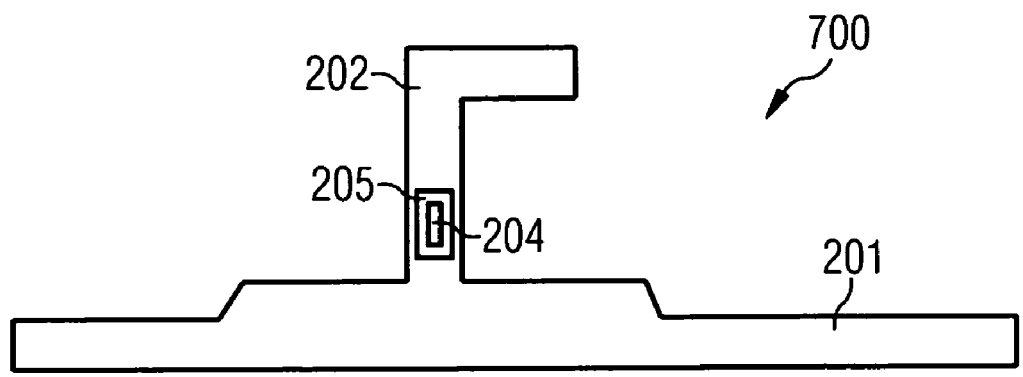
FIG. 7 is a structural element according to another embodiment.

In FIG. 7, a structural element 700 according to a sixth embodiment of one embodiment of the invention is similar to the structural element 200, but in this case, the reinforcing element 204 enveloped by a sheathing element 205 is rectangular instead of circular in cross section.

Figure 8:
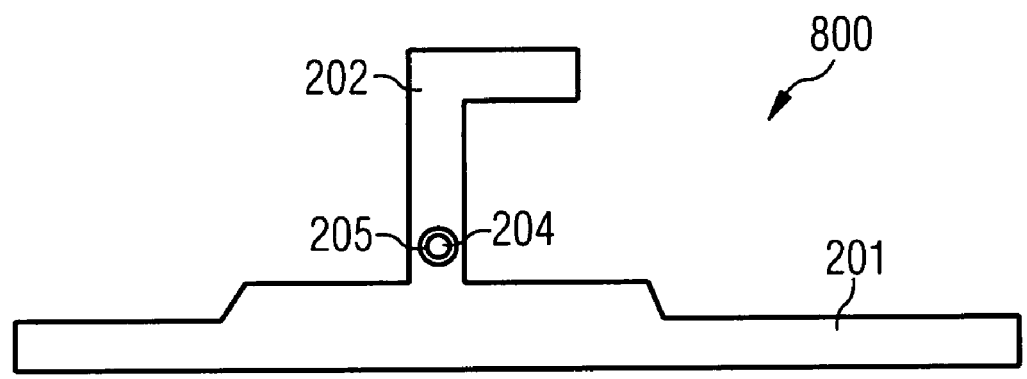
FIG. 8 is a structural element according to another embodiment.

In FIG. 8, a structural element 800 according to a seventh embodiment of the invention is similar to the structural element 200 but the reinforcing elements enveloped by a sheathing element are integrated into a bracing.

Figure 9:
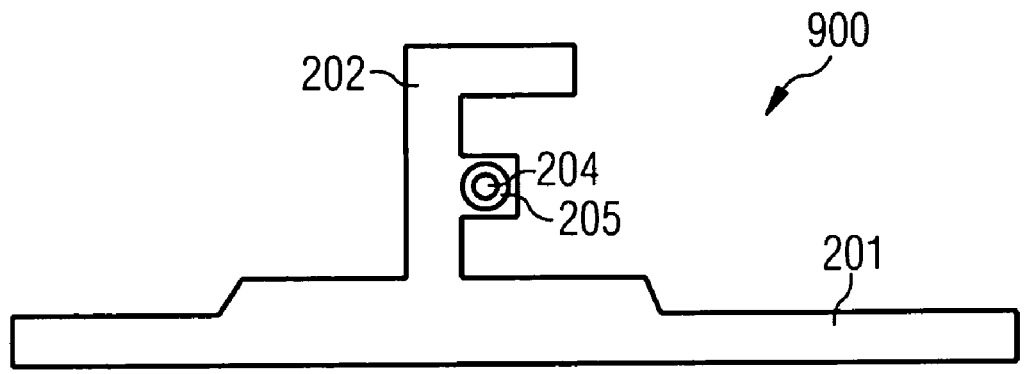
FIG. 9 is a structural element according to another embodiment.

In FIG. 9, a structural element 900 according to a seventh embodiment of the invention is similar to the structural element 200, but the reinforcing element 204 enveloped by a sheathing element 205 is arranged in a lateral projection of the bracing element 202.

The present invention is not limited in its implementation to the preferred embodiments illustrated in the drawings. Rather, many variants will be apparent from the disclosure and drawings.

In addition, let it be noted that "comprising" does not preclude any other elements or steps, and that "a" and "one" does not preclude a plurality. Let it be further noted that features or steps that have been described with reference to one of the above embodiments may also be used in combination with other features or steps from other embodiments described above. Reference signs in the claims are not to be regarded as limiting.

REFERENCE SIGNS

100 Structural element
101 Skin panel
102 Stringer
103 Reinforcing element
104 Crack initiation
105 Crack propagation
200 Structural element
201 Skin panel
202 Stringer
204 Reinforcing element
205 Sheathing element
206 Crack propagation
300 Structural element
301 Reinforcing element
302 Sheathing element
400 Structural element
500 Structural element
600 Structural element
601 Adhesive layer
602 Metal laminates
700 Structural element
800 Structural element
900 Structural element

What is claimed:

1. A structural element, comprising:
   a carrier element made of metal consisting of at least one skin panel and at least one stiffening element secured to the at least one skin panel;
   a reinforcing element embedded in the carrier element is made of a first material having a first strength value such that the reinforcing element reinforces the carrier element; and
   a sheathing element comprising fibers being made of a second material, different than the first material, the second material having a second strength value less than the first strength value, wherein the reinforcing element is enveloped by the sheathing element and is embedded in the carrier element, such that crack initiation in the reinforcing element is reduced.

2. The structural element of claim 1, wherein the carrier element is a stringer element or a frame element for an aircraft.

3. The structural element of claim 1, wherein the carrier element is a skin panel with a stringer element, a stringer element and a frame element or a frame element secured thereto.

4. The structural element of claim 3, wherein the skin panel is integrally provided with the a stringer element, a stringer element and a frame element or a frame element secured thereto.

5. The structural element of claim 3, wherein the carrier element is a skin panel with a stringer element, a stringer element and a frame element, or a frame element screwed, riveted or adhesively bonded thereto.

6. The structural element of claim 1, wherein the sheathing element has a thickness of at least 0.05 mm.

7. The structural element of claim 1, wherein the reinforcing element includes a metal material.

8. The structural element of claim 1, wherein the carrier element is made using a metal different than the first material of the reinforcing element.

9. The structural element of claim 8, wherein the first material of the reinforcing element comprises a metal alloy.

10. The structural element of claim 1, wherein the sheathing element includes a polymeric material.

11. The structural element of claim 1, wherein the sheathing element includes an organic material.

12. The structural element of claim 1, wherein the sheathing element includes a metal alloy.

13. The structural element of claim 1, wherein the fibers have a length of at least 20 mm.

14. The structural element of claim 1, wherein the fibers are unidirectionally aligned.

15. The structural element of claim 1, wherein the fibers are braided.

16. The structural element of claim 1, wherein the reinforcing element is secured to the carrier element by welding.

17. An aircraft hull comprising the structural element of claim 1.

18. A method for manufacturing a structural element comprising a carrier element, a reinforcing element for reinforcing the carrier element and a sheathing element, wherein the carrier element is made of metal, consisting of at least one skin panel and at least one stiffening element secured to the at least one skin panel, the method comprising:
   enveloping the reinforcing element with the sheathing element;
   embedding the reinforcing element and the sheathing element into the carrier element;
   making the reinforcing element on the one hand and the sheathing element on the other hand out of different materials, the sheathing element comprising fibers; and
   selecting strength values of the material of the sheathing element less than strength values of the material of the reinforcing element, such that crack initiation in the reinforcing element is reduced.

19. The method of claim 18, wherein the carrier element is made of metal by forming the carrier element as an extruded profile.

20. The method of claim 18, wherein the carrier element is made of metal by milling from a solid body.

* * * * *